(12) United States Patent
Wei et al.

(10) Patent No.: US 12,497,545 B2
(45) Date of Patent: Dec. 16, 2025

(54) SEPARATION SHEET AND USE THEREOF FOR PROVIDING WATERPROOFED STRUCTURES

(71) Applicant: SIKA TECHNOLOGY AG, Baar (CH)

(72) Inventors: Yizhe Wei, Shanghai (CN); Qin Wei, Shanghai (CN)

(73) Assignee: SIKA TECHNOLOGY AG, Baar (CH)

( * ) Notice: Subject to any disclaimer, the term of this patent is extended or adjusted under 35 U.S.C. 154(b) by 204 days.

(21) Appl. No.: 17/916,262

(22) PCT Filed: Apr. 2, 2020

(86) PCT No.: PCT/CN2020/082885
§ 371 (c)(1),
(2) Date: Sep. 30, 2022

(87) PCT Pub. No.: WO2021/196107
PCT Pub. Date: Oct. 7, 2021

(65) Prior Publication Data
US 2023/0140264 A1    May 4, 2023

(51) Int. Cl.
*C09J 7/26* (2018.01)
*C09J 7/35* (2018.01)
(Continued)

(52) U.S. Cl.
CPC . *C09J 7/26* (2018.01); *C09J 7/35* (2018.01); *C09J 7/385* (2018.01); *C09J 7/403* (2018.01);
(Continued)

(58) Field of Classification Search
CPC ....... C09J 7/26; C09J 7/35; C09J 7/385; C09J 7/403; C09J 133/08; C09J 2203/346;
(Continued)

(56) References Cited

U.S. PATENT DOCUMENTS 5,082,705 A * 1/1992 Rose ................. A47G 27/0468
428/317.1
2010/0215881 A1 8/2010 Miyata et al.
(Continued)

FOREIGN PATENT DOCUMENTS

CA    3140806 A1 * 6/2022 ............. B32B 27/12
CN    103890289 A    6/2014
(Continued)

OTHER PUBLICATIONS

Dec. 31, 2020 International Search Report issued in International Patent Application No. PCT/CN2020/082885.
(Continued)

*Primary Examiner* — Patricia L. Nordmeyer
(74) *Attorney, Agent, or Firm* — Oliff PLC (57) ABSTRACT

A separation sheet includes a polymeric carrier layer, a first adhesive layer, a second adhesive layer, and optionally a first and a second release liner. A method for producing a separation sheet, a method for waterproofing a substrate, a waterproofed substrate, and a use of the separation sheet for bonding of roof membranes to roof substrates.

19 Claims, 3 Drawing Sheets

(51) Int. Cl.
*C09J 7/38* (2018.01)
*C09J 7/40* (2018.01)
*C09J 133/08* (2006.01)

(52) U.S. Cl.
CPC ....... *C09J 133/08* (2013.01); *C09J 2203/346* (2020.08); *C09J 2301/1242* (2020.08); *C09J 2301/302* (2020.08); *C09J 2301/304* (2020.08); *C09J 2301/312* (2020.08)

(58) Field of Classification Search
CPC .......... C09J 2301/1242; C09J 2301/302; C09J 2301/304; C09J 2301/312; C09J 2433/00; C09J 2400/243; C09J 2423/006; C09J 2495/00; C09J 7/38; B32B 7/06; B32B 25/042; B32B 25/045; B32B 2266/0228; B32B 2266/0278; B32B 2266/08; B32B 2419/06; B32B 11/044; B32B 11/046; B32B 11/048; B32B 25/08; B32B 25/14; B32B 25/16; B32B 25/18; B32B 25/20; B32B 27/065; B32B 27/08; B32B 27/22; B32B 27/304; B32B 27/306; B32B 27/32; B32B 27/40; B32B 2266/0235; B32B 2266/025; B32B 2274/00; B32B 2307/748; B32B 7/12; B32B 5/18
See application file for complete search history.

(56) References Cited

U.S. PATENT DOCUMENTS

| | | |
|---|---|---|
| 2015/0050469 A1 | 2/2015 | Blanchard et al. |
| 2015/0307749 A1 | 10/2015 | Hoshi et al. |
| 2016/0137885 A1 * | 5/2016 | Maier ........................ C09J 7/38 |
| | | 428/41.8 |

FOREIGN PATENT DOCUMENTS

| | | | | |
|---|---|---|---|---|
| CN | 101619198 B | 7/2014 | | |
| CN | 110520496 A | 11/2019 | | |
| CN | 110938390 A | 3/2020 | | |
| DE | 19525403 A1 * | 1/1997 | | |
| DE | 10 2010 038 429 A1 | 1/2012 | | |
| EP | 0731232 A2 * | 9/1996 | ............... | B32B 7/02 |
| WO | WO-9510574 A1 * | 4/1995 | ............... | C09J 7/38 |
| WO | 2007/081325 A1 | 7/2007 | | |
| WO | 2009/047984 A1 | 4/2009 | | |

OTHER PUBLICATIONS

Dec. 31, 2020 Written Opinion issued in International Patent Application No. PCT/CN2020/082885.

* cited by examiner

SEPARATION SHEET AND USE THEREOF FOR PROVIDING WATERPROOFED STRUCTURES

TECHNICAL FIELD

The invention relates to the field of waterproofing of above and below ground building constructions by using water impermeable membranes. In particular, the invention relates to double-sided self-adhering separation sheets, which can be used for providing waterproofed roof structures.

BACKGROUND OF THE INVENTION

In the field of construction polymeric sheets, which are often referred to as membranes, are used to protect underground and above ground constructions, such as basements, tunnels, and flat and low-sloped roofs, against penetration water. Membranes are applied, for example, to prevent ingress of water through cracks that develop in the concrete structure due to building settlement, load deflection or concrete shrinkage. Roofing membranes used for waterproofing of flat and low-sloped roof structures can be provided as single-ply or multi-ply membrane systems. In a single-ply system, the roof substrate is covered using a roofing membrane composed of a single waterproofing layer, which can be reinforced with a reinforcement layer, such as a layer of fiber material. In multi-ply systems, a roofing membrane composed of multiple waterproofing layers of different or similar materials are used. Single-ply membranes have the advantage of lower production costs compared to the multi-ply membranes, but they are also less resistant to mechanical damages cause by punctures of sharp objects.

Commonly used materials for waterproofing and roofing membranes include plastics, particularly thermoplastics such as plasticized polyvinylchloride (p-PVC), thermoplastic olefins (TPE-O, TPO), and elastomers such as ethylene-propylene diene monomer (EPDM) rubber. Bituminous materials are also used for providing membranes since they provide good resistance against environmental factors combined with relatively low costs compared to thermoplastic polymer materials. Bitumen compositions are typically modified with synthetic polymers to increase UV-resistance, toughness, and flexibility at low temperatures. Waterproofing and roofing membranes are typically delivered to a construction site in form of rolls, transferred to the place of installation, unrolled, and adhered to the substrate to be waterproofed. The substrate on which the membrane is adhered may be comprised of variety of materials depending on the installation site. The substrate may be, for example, a concrete, metal, or wood deck, or it may include an insulation board or a cover board and/or an existing waterproofing or roofing membrane.

Roofing membranes must be securely fastened to the roof substrate to provide sufficient mechanical strength to resist the shearing forces applied on it due to wind loads. Roof systems are typically divided into two categories depending on the means used for fastening the roofing membrane to roof substrate. In a mechanically attached roof system, the roofing membrane is fastened to the roof substrate by using screws and/or barbed plates. Mechanical fastening enables high strength bonding, but it provides direct attachment to the roof substrate only at locations where a mechanical fastener affixes the membrane to the surface, which makes mechanically attached membranes susceptible to flutter. In fully-adhered roof systems the membrane is typically adhered to the roof substrate indirectly by using an adhesive composition. These types of systems have the advantage over mechanically adhered systems that the roofing membrane attached essentially over its whole surface to the surface of the roof substrate. Consequently, a reinforcing layer is not, at least in principle, required to improve the mechanical stability of the membrane since mechanical fasteners penetrating the membrane sheet are not used for attaching the membrane to the substrate.

Waterproofing and roofing membranes can be adhered to various substrates to provide fully-adhered systems by using several techniques such as by contact bonding or by using self-adhering membranes. In contact bonding both the membrane and the surface of the substrate are first coated with a solvent or water-based contact adhesive after which the membrane is contacted with the surface of the substrate. The volatile components of the contact adhesive are "flashed off" to provide a partially dried adhesive film prior to contacting the membrane with the substrate. The main disadvantages of contact bonding relate to slowness of the installation process compared to self-adhering membranes, significant emissions of volatile compounds in case of solvent-based adhesives and limited application at cold temperatures in case of water-based contact adhesives.

Self-adhering membranes used for providing fully adhered roof systems comprise a pre-applied layer of adhesive composition coated on the surface of the membrane. Typically, the pre-applied adhesive layer is covered with a release liner to prevent premature unwanted adhesion and to protect the adhesive layer from moisture, fouling, and other environmental factors. At the time of use the release liner is removed and the membrane is secured to the substrate without using additional adhesives. Self-adhering membranes having a pre-applied adhesive layer covered by a release liner are also known as "peel and stick membranes".

Plasticized PVC and bitumen membranes are commonly used for providing fully-adhered green roofs and exposed concrete roof systems. In these types of roof systems, migration of volatile compounds from the membrane material to the adhesive layer may result in deterioration of the adhesive properties and delamination of the membrane from the surface of the substrate. Consequently, PVC and bitumen-based membranes typically contain one or more barrier layers to prevent or at least to retard the migration of plasticizers and other volatile compounds from the membrane to the adhesive layer or vice versa. The presence of such migration barriers increases the complexity of the membrane build-up and thus the production costs of such membranes. Furthermore, renovation of aged bitumen-based roof systems using polymeric membranes is risky since the volatile components contained in the bitumen material tend to migrate to the newly installed membrane resulting in degradation of the polymeric membrane material.

There thus remains a need for a novel solution, which enables using a simplified method for providing new green roofs, exposed concrete roofs, and renovation of aged bitumen roof systems.

SUMMARY OF THE INVENTION

The object of the present invention is to provide a separation sheet, which enables construction of new green roofs, exposed concrete roofs, and renovation of aged bitumen roof systems by a simplified method based on the use of commercially available roofing membranes.

Another object of the present invention is to provide a separation sheet, which enables providing fully-adhered roof systems with reduced material and installation costs.

The subject of the present invention is a separation sheet as defined in claim 1.

It was surprisingly found out that a double-sided self-adhering separation sheet enables providing fully-adhered green roofs, exposed concrete roofs, and renovation of aged bitumen roof systems without the use of self-adhering roofing membranes or contact adhesives. Consequently, the installation and material costs of fully-adhered roof systems and of renovated bitumen roof systems can be reduced by using the separation sheet of the present invention.

One of the advantages of the separation sheet of the present invention is that polyvinylchloride and bitumen membranes without a barrier layer against the migration of volatile compounds can be used for providing fully-adhered roof systems.

Other aspects of the present invention are presented in other independent claims. Preferred aspects of the invention are presented in the dependent claims.

BRIEF DESCRIPTION OF THE DRAWINGS

FIG. 2.1-FIG. 2.4 show a schematic presentation of a method for waterproofing a substrate.

The proportion of thicknesses of the layers in FIGS. 1 to 3 is not true to scale. For example, the ratio of the thickness of the polymeric carrier layer (2) to the thickness of the first (3) and second adhesive layer (4) is in reality far higher than that shown in any one of the FIGS. 1 to 3.

DETAILED DESCRIPTION OF THE INVENTION

Figure 1:
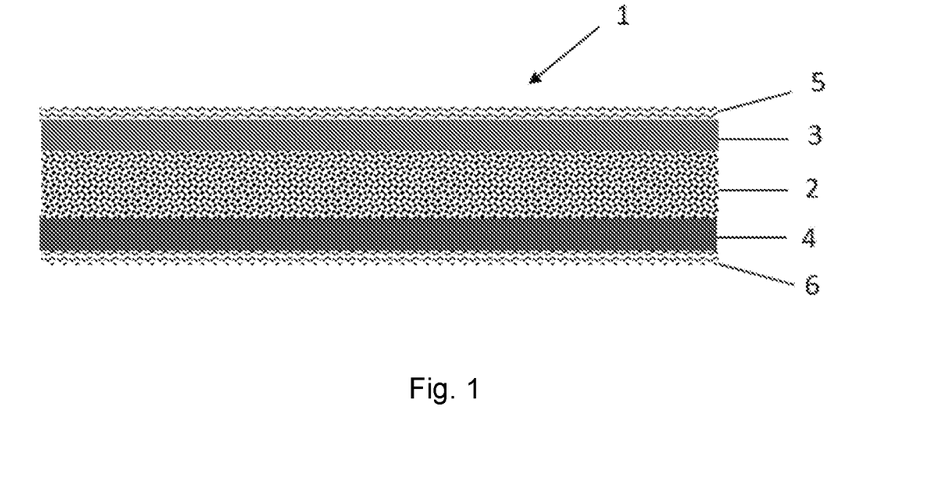
FIG. 1 shows a cross-section of a separation sheet (1) comprising a polymeric carrier layer (2), a first adhesive layer (3), a second adhesive layer (4), and a first (5) and a second release liner (6).
Figure 3:
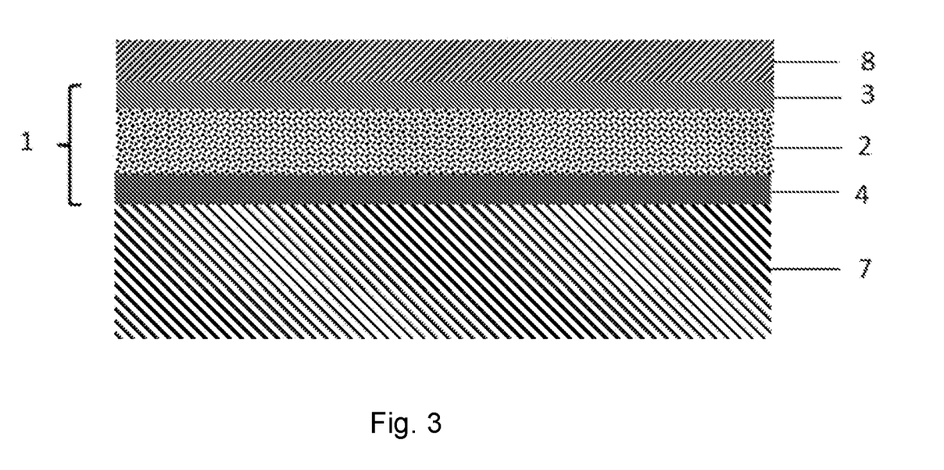
FIG. 3 shows a cross-section of a waterproofed structure comprising a substrate (7), a separation sheet (1), and a membrane (8), wherein the membrane (8) is bonded to the polymeric carrier layer (2) via the first adhesive layer (3) and the polymeric carrier layer (2) is bonded to the substrate (7) via the second adhesive layer (4).

The subject of the present invention a separation sheet (1) comprising
i) A polymeric carrier layer (2) having a first and a second major surface,
ii) A first adhesive layer (3) covering at least a portion of the first major surface of the carrier layer (2),
iii) A second adhesive layer (4) covering at least a portion of the second major surface of the second major surface of the carrier layer (2),
iv) Optionally a first release liner (5) covering the outwardly facing surface of the first adhesive layer (3) opposite to the side of the carrier layer (2), and
v) Optionally a second release liner (6) covering the outwardly facing surface of the second adhesive layer (4) opposite to the side of the carrier layer (2),
wherein
the first adhesive layer (3) is composed a first adhesive composition and the second adhesive layer (4) is composed of a second adhesive composition different from the first adhesive composition.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "molecular weight" designates the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C.

The term "softening point" or "softening temperature" designates a temperature at which compound softens in a rubber-like state, or a temperature at which the crystalline portion within the compound melts. The softening point can be measured by a Ring and Ball method as defined in DIN EN 1238 standard.

The term "melting temperature" designates a temperature at which a material undergoes transition from the solid to the liquid state. The melting temperature ($T_m$) is preferably determined by differential scanning calorimetry (DSC) according to ISO 11357-3 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The term "glass transition temperature" ($T_g$) designates the temperature above which temperature a polymer component becomes soft and pliable, and below which it becomes hard and glassy. The glass transition temperature is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one thermoplastic polymer" refers to the sum of the individual amounts of all thermoplastic polymers contained in the composition. Furthermore, in case the composition comprises 20 wt.-% of at least one thermoplastic polymer, the sum of the amounts of all thermoplastic polymers contained in the composition equals 20 wt.-%.

The term "room temperature" designates a temperature of 23° C.

The separation sheet of the present invention comprises a polymeric carrier layer having a first and a second adhesive layers on the opposite sides of the polymeric carrier layer. The term "layer" refers in the present disclosure generally to a sheet-like element having first and second major surfaces, i.e. top and bottom surfaces, a width defined between longitudinally extending edges, and a thickness defined between the first and second major surfaces. Preferably, a layer has a length and width at least 15 times, preferably at least times, more preferably at least 50 times greater than the thickness of the element.

The term "polymeric layer" refers in the present disclosure to a layer comprising a continuous phase composed of one or more polymers. The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

Preferably, the polymeric carrier layer has a thickness of at least 0.15 mm, more preferably at least 0.25 mm, even more preferably at least 0.35 mm, still more preferably at least 0.5 mm. According to one or more embodiments, the polymeric carrier layer has a thickness of 0.35-5.0 mm, preferably 0.45-3.5 mm, more preferably 0.55-3.0 mm, even more preferably 0.65-3.0 mm, still more preferably 0.75-2.5 mm, most preferably 0.8-2.0 mm. The thickness of the polymeric carrier layer can be determined by using the measurement method as defined in DIN EN 1849-2 standard. Polymeric carrier layers having a thickness falling within the above presented ranges have been found out to provide the separation layer with adequate mechanical stability and to enable adhering of the separation sheet to substrates having relatively rough/irregular surface structure.

Preferably, the polymeric carrier layer has a width of at least 0.25 m, more preferably at least 0.35 m, even more preferably at least 0.45 m, still more preferably at least 0.55 m, most preferably at least 0.65 m, in particular at least 0.75 m. The term "width" and "length" refer to the two perpendicular dimensions measured in the horizontal plane of the first and second major surfaces of a sheet-like element. Generally, the "width" of a sheet like element is the smaller of the horizontal dimensions of a sheet-like element. Consequently, the "width" of the polymeric carrier layer refers to the minor dimension measured in the horizontal plane of the carrier layer in a direction perpendicular to the length of the polymeric carrier layer.

The separation sheets of the present invention are typically provided in a form of prefabricated articles, which are delivered to the construction site in form of rolls, which are then unwounded to provide sheets having length of several times the width. According to one or more embodiments, the polymeric carrier layer has a width of 0.55-5.0 m, preferably 0.65-4.0 m, more preferably 0.75-3.5 m, even more preferably 0.85-3.0 m, still more preferably 0.95-2.5 m, most preferably 1.0-2.0 m.

According to one or more embodiments, the polymeric carrier layer comprises at least 50 wt.-%, preferably at least 75 wt.-%, based on the total weight of the polymeric carrier layer, of at least one polymer P. Suitably polymers used as the at least one polymer P include, for example, crystalline, semi-crystalline, and amorphous polymers, thermoplastic elastomers, and elastomers including chemically crosslinked and non-crosslinked types of the above listed polymers. The term "chemically crosslinked" is understood to mean that the polymer chains are inter-connected by a plurality of covalent bonds, which are mechanically and thermally stable.

According to one or more embodiments, the at least one polymer P is selected from the group consisting of polyolefins, copolymers of ethylene and/or propylene, polyurethane, polyvinylchloride, plasticized polyvinylchloride, and elastomers. The term "elastomer" refers to any polymer or a blend of polymers, which can recover from large deformations. Typical elastomers are capable of being elongated or deformed to at least 200% of their original dimension under an externally applied force, and will substantially resume the original dimensions, sustaining only small permanent set (typically no more than about 20%), after the external force is released. In the present disclosure, the term "elastomer" may be used interchangeably with the term "rubber."

Suitable elastomers to be used as the at least one polymer P include, for example, styrene-butadiene rubber (SBR), ethylene propylene diene monomer (EPDM) rubber, butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber.

In addition to the at least one polymer P, the polymeric carrier layer may further contain one or more auxiliary components, such as, UV- and heat stabilizers, antioxidants, plasticizers, flame retardants, fillers, dyes, pigments, matting agents, antistatic agents, impact modifiers, biocides, and processing aids such as lubricants, slip agents, antiblock agents, and denest aids. The total amount of these auxiliary components is preferably not more than 25 wt.-%, more preferably not more than 15 wt.-%, most preferably not more than 5 wt.-%, based on the total weight of the polymeric carrier layer.

According to one or more preferred embodiments, the polymeric carrier layer is composed of cellular foam material, preferably comprising closed cell foam. The term "closed cell foam" refers in the present disclosure to a foam that contains discrete, non-interconnecting cells formed by the trapped pockets of gas. Preferably, the term "closed cell" foam refers to a foam in which at least 50% of the pore volume is composed of discrete, non-interconnecting cells formed by the trapped pockets of gas.

According to one or more embodiments, the closed cell foam is selected from the group consisting of ethylene vinyl acetate foam, polyurethane foam, ethylene propylene diene monomer foam, polyolefin foam, polyvinylchloride foam, and plasticized polyvinylchloride foam, preferably from the group consisting of ethylene vinyl acetate foam and polyurethane foam.

The first adhesive layer and the polymeric carrier layer are preferably directly connected to each over at least a portion of their opposing major surfaces and the second adhesive layer and the carrier layer are preferably directly connected to each over at least a portion of their opposing major surfaces. The expression "directly connected" is understood to mean in the context of the present disclosure that no further layer or substance is present between the two layers and that the opposing surfaces of the two layers are directly bonded to each other or adhere to each other.

Preferably, the first adhesive layer covers at least 50%, more preferably at least 75%, even more preferably at least 85%, still more preferably at least 95 wt.-% of the area of the first major surface of the polymeric carrier layer and/or the second adhesive layer covers at least 50%, more preferably at least 75%, even more preferably at least 85%, still more preferably at least 95 wt.-% of the area of the second major surface of the polymeric carrier layer.

According to one more embodiments, the first adhesive layer covers essentially the entire area of the first major surface of the polymeric carrier layer, such as at least 97.5%, preferably at least 99% of the area of the first major surface of the polymeric carrier layer and/or the second adhesive layer covers essentially the entire area of the second major surface of the polymeric carrier layer, such as at least 97.5%, preferably at least 99% of the area of the second major surface of the polymeric carrier layer.

The first and second adhesive layers can be present on the first and second major surface of the polymeric carrier layer, respectively, in form of a continuous or a discontinuous adhesive layer. The term "continuous adhesive layer" refers in the present disclosure to layers consisting of one single area coated with an adhesive composition whereas the term "discontinuous adhesive layer" refers to layers consisting of two or more areas coated with an adhesive composition, which areas are not connected to each other to form a continuous layer. According to one or more embodiments, the first and second adhesive layers are continuous adhesive layers.

The thicknesses of the first and second adhesive layers are not particularly restricted in the present invention and they depend on the embodiment of the separation sheet, particularly on the type of the first and second adhesive layers. According to one or more embodiments, the first adhesive layer has a thickness of at least 25 µm, preferably at least 35 µm and/or the second adhesive layer has a thickness of at least 45 µm, preferably at least 55 µm. According to one or more embodiments, the first adhesive layer has a thickness of 35-500 µm, preferably 40-350 µm, more preferably 45-250 µm, even more preferably 50-150 µm and/or the second adhesive layer has a thickness of 55-1500 um, preferably 75-1000 µm, more preferably 85-750 µm, even more preferably 100-500 µm.

Preferably, the first and second adhesive compositions are pressure sensitive adhesives (PSA). The term "pressure sensitive adhesive" refers in the present disclosure to viscoelastic materials, which adhere immediately to almost any kind of substrates by application of light pressure and which are permanently tacky. The tackiness of an adhesive layer can be measured, for example, as a loop tack. Preferably, the pressure sensitive adhesive has a loop tack adhesion to a glass plate measured at a temperature of 23° C. of at least 2.5 N/25 mm, preferably at least 5 N/25 mm, more preferably at least 10 N/25 mm. The loop tack adhesion can be measured using a "FINAT test method no. 9 (FTM 9) as defined in FINAT Technical Handbook, 9th edition, published in 2014.

According to one or more embodiments, the first adhesive composition is a plasticizer-resistant pressure sensitive adhesive. The term "plasticizer-resistant adhesive" designates in the present disclosure an adhesive that has improved resistance against softening caused by the migration of plasticizers into the adhesive from the substrate on which the adhesive has been coated.

Typical plasticizers used in substrates, such as in plasticized PVC membranes include, for example, linear and branched phthalates such as di-isononyl phthalate (DINP), di-nonyl phthalate (L9P), diallyl phthalate (DAP), di-2-ethylhexyl-phthalate (DEHP), dioctyl phthalate (DOP), diisodecyl phthalate (DIDP), and mixed linear phthalates (911P). Other suitable plasticizers include phthalate-free plasticizers, such as trimellitate plasticizers, adipic polyesters, and biochemical plasticizers. Examples of suitable biochemical plasticizers include epoxidized vegetable oils, for example, epoxidized soybean oil and epoxidized linseed oil and acetylated waxes and oils derived from plants, for example, acetylated castor wax and acetylated castor oil.

Suitable pressure sensitive adhesives to be used as the first adhesive composition include water-based, solvent-based, hot-melt, and crosslinked pressure sensitive adhesives, such as UV-cured pressure sensitive adhesives. The term "hot-melt pressure sensitive adhesive (HM-PSA)" refers in the present disclosure to solvent-free pressure sensitive adhesives, which are applied as a melt.

The polymer basis of the first adhesive layer is not particularly restricted and suitable adhesives to be used as the first adhesive composition include adhesives based on acrylic polymers, styrene block copolymers, amorphous polyolefins (APO), amorphous poly-alpha-olefins (APAO), vinyl ether polymers, bitumen, and elastomers such as, for example, styrene-butadiene rubber (SBR), ethylene propylene diene monomer (EPDM) rubber, butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber. In addition to the above-mentioned polymers, suitable pressure sensitive adhesive compositions typically comprise one or more additional components including, for example, tackifying resins, waxes, and additives, for example, UV-light absorption agents, UV- and heat stabilizers, optical brighteners, pigments, dyes, and desiccants.

According to one or more preferred embodiments, the first adhesive composition is an acrylic pressure sensitive adhesive. The term "acrylic pressure sensitive adhesive" designates in the present disclosure pressure sensitive adhesive compositions containing one or more acrylic polymers as the main polymer component.

Suitable acrylic pressure sensitive adhesives include, for example, water-based acrylic pressure sensitive adhesives, solvent-based acrylic pressure sensitive adhesives, acrylic hot-melt pressure sensitive adhesives (HM-PSA), and UV-cured acrylic pressure sensitive adhesives.

The term "water-based acrylic pressure sensitive adhesive" designates in the present disclosure pressure sensitive adhesive compositions comprising one or more acrylic polymers, which have been formulated as an aqueous dispersion, an aqueous emulsion, or as an aqueous colloidal suspension. The term "aqueous dispersion" or "aqueous emulsion" refers to dispersions or emulsions containing water as the main continuous (carrier) phase. Typically, a water-based acrylic pressure sensitive adhesive comprises surfactants to stabilize the hydrophobic polymer particles and to prevent these from coagulating to each other.

The term "solvent-based acrylic pressure sensitive adhesive" designates in the present disclosure pressure sensitive adhesive compositions comprising a solvent and one or more acrylic polymers, which are substantially completely dissolved in the solvent. Typically, the solvent comprises at least 20 wt.-%, preferably at least 30 wt.-%, more preferably at least 40 wt.-%, of the total weight of the adhesive composition. Suitable solvents for the solvent-based acrylic pressure sensitive adhesives include, for example, alcohols, aliphatic and aromatic hydrocarbons, ketones, esters, and mixtures thereof. It is possible to use only a single solvent or a mixture of two or more solvents. Suitable solvent-based acrylic pressure sensitive adhesives are substantially water-free, for example, containing less than 10 wt.-%, preferably less than 5 wt.-%, more preferably less than 1 wt.-% of water, based on the total weight of the adhesive composition.

In case the first adhesive composition is a water-based or a solvent-based acrylic pressure sensitive adhesive, the adhesive is applied on the first major surface of the polymeric carrier layer for form a wet film of the adhesive, which is dried by allowing the water or solvent contained in the wet adhesive film to evaporate. In this context the expression "the first adhesive layer is composed of a first adhesive composition" is understood to mean that the first adhesive layer has been obtained by applying a first adhesive composition as a wet film onto the first major surface of the polymeric carrier layer followed by allowing the volatile components to evaporate.

The term "acrylic hot-melt pressure sensitive adhesive" refers in the present disclosure to solvent-free acrylic pressure sensitive adhesives, which are applied as a melt. In case the first adhesive composition is an acrylic hot-melt pressure sensitive adhesive, the first adhesive layer has preferably been obtained by applying the first adhesive composition as a melt on the onto the first major surface the polymeric carrier layer and allowing the applied adhesive to cool and to solidify.

The term "UV-cured acrylic pressure sensitive adhesive" refers in the present disclosure to acrylic pressure sensitive adhesives, which have been cured by initiation of photochemical curing reactions. The term "curing" refers here to chemical reactions comprising forming of bonds resulting, for example, in chain extension and/or crosslinking of polymer chains.

In case the first adhesive composition is an UV-cured acrylic pressure sensitive adhesive, the first adhesive layer has preferably been obtained by applying an UV-curable acrylic pressure sensitive adhesive composition as a film onto the first major surface of the polymeric carrier layer followed by subjecting the adhesive film to UV-radiation thereby to effect curing of the adhesive composition.

According to one or more embodiments, the acrylic pressure sensitive adhesive comprises at least 65 wt.-%, preferably at least 75 wt.-%, more preferably at least 85 wt.-%, even more preferably at least 90 wt.-% of at least one acrylic polymer AP, based on the total weight of the acrylic pressure sensitive adhesive.

The term "acrylic polymer" designates in the present disclosure homopolymers, copolymers and higher interpolymers of an acrylic monomer with one or more further acrylic monomers and/or with one or more other ethylenically unsaturated monomers. The term "acrylic monomer" refers in the present disclosure to monomers having at least one (meth)acryloyl group in the molecule. The term "(meth)acryloyl" designates methacryloyl or acryloyl. Accordingly, "(meth)acrylic" designates methacrylic or acrylic. A (meth)acryloyl group is also known as (meth)acryl group.

Preferably, the at least one acrylic polymer AP has a glass transition temperature ($T_g$), determined by dynamical mechanical analysis (DMA) as the peak of the measured loss modulus (G″) curve using an applied frequency of 1 Hz and a strain level of 0.1%, of below 0° C., preferably below −10° C. and/or an average molecular weight ($M_n$) in the range of 50,000-1,000,000 g/mol, in particular 100,000-750,000 g/mol, more preferably 150,000-500,000 g/mol.

Examples of suitable acrylic monomers include, for example, (meth)acrylates, (meth)acrylic acid or derivatives thereof, for example, amides of (meth)acrylic acid or nitriles of (meth)acrylic acid, and (meth)acrylates with functional groups such as hydroxyalkyl (meth)acrylates, and hydroxyl group-containing (meth)acrylates.

Preferred acrylic polymers to be used as the at least one acrylic polymer AP contain acrylic monomers as the main monomer component, i.e. preferred acrylic polymers contain at least 30 wt.-%, preferably at least 40 wt.-%, more preferably at least 50 wt.-% of acrylic monomers, based on the weight of the acrylic polymer.

Particularly suitable acrylic polymers to be used as the at least one acrylic polymer AP contain alkyl (meth)acrylates, preferably (meth)acrylic acid esters of alcohols containing from 1 to 24 carbon atoms, as the main monomer component. There are preferably more than 25 wt.-%, preferably more than 35 wt.-% of these types of acrylic monomers in the acrylic polymer. Examples of particularly suitable alkyl (meth)acrylates include, for example, methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, as for example isobutyl acrylate, 2-ethylhexyl acrylate, 2-ethylhexyl methacrylate, isooctyl acrylate, isooctyl methacrylate, and also cyclohexyl methacrylate, isobornyl acrylate, isobornyl methacrylate or 3,5-dimethyladamantyl acrylate.

Suitable comonomers to be used with the alkyl (meth)acrylates include, for example, hydroxyl-group and hydroxyalkyl-group containing acrylic monomers. Examples of suitable hydroxyl-group and hydroxyalkyl-group containing acrylic monomers include, for example, 2-hydroxyethyl(meth)acrylate, 2-hydroxypropyl(meth)acrylate, 3-hydroxypropyl (meth)acrylate, 2-hydroxybutyl (meth)acrylate, 4-hydroxybutyl butyl(meth)acrylate, 2-hydroxy-hexyl(meth)acrylate, 6-hydroxy hexyl(meth)acrylate, 8-hydroxyoctyl(meth)acrylate, 10-hydroxydecyl (meth)acrylate, 12-hydroxylauryl(meth)acrylate. Furthermore, suitable are (4-hydroxymethyl cyclohexyl)methyl acrylate, polypropylene glycol mono (meth)acrylate, N-hydroxyethyl (meth)acrylamide, and N-hydroxypropyl (meth) acrylamide. Hydroxyl-group and hydroxyalkyl-group containing acrylic monomers are preferably used in a range of 0.01-15 wt.-%, more preferably 0.1-10 wt.-%, based on the total amount of the monomers used in the synthesis of the acrylic polymer.

Other suitable comonomers for the at least one acrylic polymer AP include vinyl compounds, in particular vinyl esters, vinyl halides, vinylidene halides, ethylenically unsaturated hydrocarbons with functional groups, and nitriles of ethylenically unsaturated hydrocarbons. Examples of suitable vinyl compounds include, for example, maleic anhydride, styrene, styrenic compounds, beta-acryloyloxypropionic acid, vinylacetic acid, fumaric acid, crotonic acid, aconitic acid, trichloroacrylic acid, itaconic acid, and vinyl acetate In addition to the at least one acrylic polymer AP, the acrylic pressure sensitive adhesive may comprise one or more additional constituents including, for example, tackifying resins, waxes, and plasticizers as well as one or more additives such as, for example, UV-light absorption agents, UV- and heat stabilizers, optical brighteners, pigments, dyes, and desiccants. Preferably, the amount of such additional constituents and additives is not more than 25 wt.-%, more preferably not more than 15 wt.-%, even more preferably not more than 10 wt.-%, based on the total weight of the acrylic pressure sensitive adhesive.

According to one or more embodiments, the acrylic pressure sensitive adhesive is a solvent-based acrylic pressure sensitive adhesive.

According to one or more embodiments, the acrylic pressure sensitive adhesive is an UV-cured acrylic pressure sensitive adhesive (PSA) or an UV-cured acrylic hot-melt pressure sensitive adhesive (HM-PSA).

These types of adhesives have been found out to be suitable for use in the first adhesive layer since they have a broader operating window in terms of minimum and maximum application temperature. Furthermore, UV-cured acrylic pressure sensitive adhesives have been found out to maintain their adhesive strength at higher temperatures compared to non-cured acrylic pressure sensitive adhesives. Finally, UV-cured acrylic pressure sensitive adhesives have been found out to allow adjustments in the formulation to achieve greater tackiness even at low temperatures.

According to one or more embodiments, the acrylic pressure sensitive adhesive is an at least partially cured UV-curable acrylic pressure sensitive adhesive composition comprising:
  a) At least 65 wt.-%, preferably at least 85 wt.-%, of the at least acrylic polymer AP,
  b) 0.01-5 wt.-%, preferably 0.1-1 wt.-%, of at least one curing agent,
  c) 0.1-5 wt.-%, preferably 0.25-2.5 wt.-%, of at least one photo initiator, and
  d) 0-30 wt.-%, preferably 5.0-20 wt.-%, of at least one tackifying resin, all proportions being based on the total weight of the adhesive composition.

The at least one curing agent is preferably a multifunctional acrylate selected from the group consisting of butanediol dimethacrylate, ethyleneglycol dimethacrylate, diethyleneglycol dimethacrylate, triethyleneglycol dimethacrylate, trimethylolpropane trimethacrylate, butanediol diacrylate, hexanediol diacrylate, trimethylolpropane triacrylate, and tripropyleneglycol diacrylate, trimethylolpropane ethoxy triacrylate, trimethylolpropane triacrylate, tripropylene glycol diacrylate, propylene glycol dimethacrylate, dipropylene glycol diacrylate, dipentaerythritol hydroxy pentaacrylate, neopentyl glycol propoxylate diacrylate, bisphenol A ethoxylate dimethacrylate, alkoxylated hexanediol diacrylate, ethoxylated bisphenol A diacrylate, ethoxylated bisphenol A dimethacrylate, ethoxylated trimethylolpropane triacrylate, propoxylated neopentyl glycol diacrylate, propoxylated glyceryl triacrylate, polybutadiene diacrylate, and polybutadiene dimethacrylate.

Suitable compounds to be used as the at least one photo initiator include, for example, benzoic ethers, dialkoxyacetophenones, alpha-hydroxycyclohexyl aryl ketones, alpha-ketophenylacetate esters, benzyldialkylketals, chloro- and alkylthioxanthones and alpha-amino- and alpha-hydroxyalkyl aryl ketones.

According to one or more further embodiments, the acrylic pressure sensitive adhesive is an UV-cured acrylic hot-melt pressure sensitive adhesive (HM-PSA), wherein the at least one acrylic polymer AP comprises polymerized units that serve as photoinitiators. Suitable polymerized units that serve as photo initiators may be obtained by using copolymerizable photo initiators, such as acetophenone and benzophenone derivatives.

According to one or more embodiments, the acrylic pressure sensitive adhesive is an at least partially cured UV-curable acrylic hot-melt pressure sensitive adhesive composition comprising.
  a') At least 65 wt.-%, preferably at least 85 wt.-%, of at least one UV-curable acrylic polymer UV-AP having a photo initiator group,
  b') 0-15 wt.-% of at least one reactive diluent, and
  c') 0-20 wt.-% of at least one filler and/or at least one flame retardant, all proportions being based on the total weight of the adhesive composition.

The at least one UV-curable acrylic polymer UV-AP may contain 0.05-10 wt.-%, preferably 0.1-2 wt.-%, more preferably 0.1-1.0 wt.-%, based on the weight of the polymer, of ethylenically unsaturated compounds having a photo initiator group.

Suitable UV-curable acrylic hot-melt pressure sensitive adhesives are commercially available, for example, under the trade name of acResin® (from BASF), under the trade name of AroCure® (form Ashland Chemical), and under the trade name of NovaMeltRC® (from NovaMelt).

Suitable pressure sensitive adhesives to be used as the second adhesive composition include water-based, solvent-based, hot-melt, and cured pressure sensitive adhesives, such as UV-cured pressure sensitive adhesives.

The polymer basis of the second adhesive layer is not particularly restricted and suitable adhesives to be used as the second adhesive composition include adhesives based on acrylic polymers, styrene block copolymers, amorphous polyolefins (APO), amorphous poly-alpha-olefins (APAO), vinyl ether polymers, bitumen, and elastomers such as, for example, styrene-butadiene rubber (SBR), ethylene propylene diene monomer (EPDM) rubber, butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber. In addition to the above-mentioned polymers, suitable pressure sensitive adhesive compositions typically comprise one or more additional components including, for example, tackifying resins, waxes, and additives, for example, UV-light absorption agents, UV- and heat stabilizers, optical brighteners, pigments, dyes, and desiccants.

According to one or more embodiments, the second adhesive composition is a hot-melt pressure sensitive adhesive, preferably a polymeric or a bituminous hot-melt pressure sensitive adhesive.

According to one or more embodiments, the second adhesive composition is a polymeric hot-melt pressure sensitive adhesive comprising:
  A) 5-65 wt.-% of a polymer component,
  B) 10-80 wt.-% of at least one tackifying resin,
  C) 0-60 wt.-% of at least one mineral filler,
  D) 0-15 wt.-% of at least one process oil, and
  E) 0-50 wt.-% of at least one liquid polyolefin resin, all proportions being based on the total weight of the polymeric pressure sensitive adhesive.

According to one or more embodiments, the polymer component comprises at least one styrene block copolymer.

Suitable styrene block copolymers include block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks.

According to one or more embodiments, the polymer component comprises or essentially consists of at least one styrene block copolymer selected from the group consisting of styrene-isoprene-styrene (SIS) block copolymer, styrene-butadiene-styrene (SBS) block copolymer, styrene-isoprene-butadiene-styrene block copolymer (SIBS), styrene-ethylene-butadiene-styrene (SEBS) block copolymer, and styrene-ethylene-propylene-styrene (SEPS) block copolymer. Suitable styrene block copolymers can have a linear, radial, or star structure, the linear structure being preferred. Styrene block copolymers of the SXS-type having saturated and unsaturated middle blocks are suitable as well as hydrogenated styrene block copolymers.

According to one or more further embodiments, the polymer component comprises at least one elastomer, preferably an elastomer that is not chemically crosslinked.

According to one or more embodiments, the polymer component comprises at least one elastomer selected from the group consisting of styrene-butadiene rubber (SBR), ethylene propylene diene monomer (EPDM) rubber, butyl rubber, polyisoprene, polybutadiene, natural rubber, polychloroprene rubber, ethylene-propylene rubber (EPR), nitrile rubber, acrylic rubber, and ethylene vinyl acetate rubber.

According to one or more embodiments, the polymer component comprises or essentially consists of at least one butyl rubber.

The term "butyl rubber" designates in the present disclosure a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin.

The preferred $C_4$ to $C_7$ monoolefin monomer may be selected from the group consisting of isobutylene, 2-methyl-1-butene, 3-methyl-1-butene, 2-methyl-2-butene, 4-methyl-1-pentene, and mixtures thereof.

The preferred $C_4$ to $C_{14}$ multiolefin comprises a $C_4$ to $C_{10}$ conjugated diolefin. The preferred $C_4$ to $C_{10}$ conjugated diolefin may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

Preferably, the at least one butyl rubber is derived from a monomer mixture containing from about 80 wt.-% to about 99 wt.-% of a $C_4$ to $C_7$ monoolefin monomer and from about 1.0 wt.-% to about 20 wt.-% of a $C_4$ to $C_{14}$ multiolefin monomer. More preferably, the monomer mixture contains from about 85 wt.-% to about 99 wt.-% of a $C_4$ to $C_7$ monoolefin monomer and from about 1.0 wt.-% to about 10 wt.-% of a $C_4$ to $C_{14}$ multiolefin monomer. Most preferably, the monomer mixture contains from about 95 wt.-% to about 99 wt.-% of a $C_4$ to $C_7$ monoolefin monomer and from about 1.0 wt.-% to about 5.0 wt.-% of a $C_4$ to $C_{14}$ multiolefin monomer.

The most preferred at least one butyl rubber is derived from a monomer mixture comprising from about 97 wt.-% to about 99.5 wt.-% of isobutylene and from about 0.5 wt.-% to about 3 wt.-% of isoprene.

According to one or more embodiments, the polymer component comprises 5-60 wt.-%, preferably 10-55 wt.-%, more preferably 15-55 wt.-%, even more preferably 20-50 wt.-% of the total weight of the polymeric hot-melt pressure sensitive adhesive.

The term "tackifying resin" designates in the present disclosure resins that in general enhance the adhesion and/or tackiness of an adhesive composition. The term "tackiness" designates in the present disclosure the property of a substance of being sticky or adhesive by simple contact. The tackiness can be measured, for example, as a loop tack. Preferred tackifying resins are tackifying at a temperature of 25° C.

According to one or more embodiments, the at least one tackifying resin comprises 10-75 wt.-%, preferably 15-70 wt.-%, more preferably 20-65 wt.-%, even more preferably 25-60 wt.-% of the total weight of the polymeric hot-melt pressure sensitive adhesive.

Examples of suitable tackifying resins to be used in the second adhesive composition include natural resins, synthetic resins and chemically modified natural resins.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins generally resulting from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomer or cycloaliphatic monomer include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, dicyclopentadiene, and terpenes. Aromatic monomer can include $C_8$, $C_9$, and $C_{10}$ aromatic monomer. Examples of aromatic monomer include styrene, indene, derivatives of styrene, derivatives of indene, coumarone and combinations thereof.

Particularly suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum-based feedstocks are referred in the present disclosure as "hydrocarbon resins" or "petroleum hydrocarbon resins". These include also pure monomer aromatic resins, which are made by polymerizing aromatic monomer feedstocks that have been purified to eliminate color causing contaminants and to precisely control the composition of the product. Hydrocarbon resins typically have a relatively low average molecular weight ($M_n$), such in the range of 250-5000 g/mol and a glass transition temperature, determined by dynamical mechanical analysis (DMA) as the peak of the measured loss modulus (G") curve using an applied frequency of 1 Hz and a strain level of 0.1%, of above 0° C., preferably equal to or higher than 15° C., more preferably equal to or higher than 30° C.

Examples of suitable hydrocarbon resins include C5 aliphatic hydrocarbon resins, mixed C5/C9 aliphatic/aromatic hydrocarbon resins, aromatic modified C5 aliphatic hydrocarbon resins, cycloaliphatic hydrocarbon resins, mixed C5 aliphatic/cycloaliphatic hydrocarbon resins, mixed C9 aromatic/cycloaliphatic hydrocarbon resins, mixed C5 aliphatic/cycloaliphatic/C9 aromatic hydrocarbon resins, aromatic modified cycloaliphatic hydrocarbon resins, C9 aromatic hydrocarbon resins, polyterpene resins, and copolymers and terpolymers of natural terpenes as well hydrogenated versions of the aforementioned hydrocarbon resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

Suitable hydrocarbon resins are commercially available, for example, under the trade name of Wingtack® series, Wingtack® Plus, Wingtack® Extra, and Wingtack® STS (all from Cray Valley); under the trade name of Escorez® 1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

According to one or more embodiments, the at least one tackifying resin has:
- a softening point measured by a Ring and Ball method according to DIN EN 1238 standard in the range of 65-185° C., preferably 75-175° C., more preferably 80-170° C. and/or
- an average molecular weight ($M_n$) in the range of 150-5000 g/mol, preferably 250-3500 g/mol, more preferably 250-2500 g/mol and/or
- a glass transition temperature ($T_g$) determined by dynamical mechanical analysis (DMA) as the peak of the measured loss modulus (G") curve using an applied frequency of 1 Hz and a strain level of 0.1% of at or above 0° C., preferably at or above 15° C., more preferably at or above 25° C., even more preferably at or above 30° C., still more preferably at or above 35° C.

According to one or more embodiments, the polymeric hot-melt pressure sensitive adhesive further comprises at least one mineral filler, preferably in an amount of 5-60 wt.-%, preferably 5-50 wt.-%, more preferably 10-40 wt.-%, even more preferably 10-30 wt.-%, based on the total weight of the polymeric hot-melt pressure sensitive adhesive.

Suitable compounds to be used as the at least one mineral filler include, for example, sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The at least one mineral filler is preferably present in the pressure sensitive adhesive composition in the form of finely divided particles. The term "finely divided particles" refers to particles, whose median particle size $d_{50}$ does not exceed 500 μm, preferably 350 μm, more preferably 150 μm. The term "median particle size $d_{50}$" refers in the present disclosure to a particle size below which 50% of all particles by volume are smaller than the $d_{50}$ value. The particle size distribution can be determined, for example, by sieve analysis according to the method as described in ASTM C136/C136M-2014 standard ("Standard Test Method for Sieve Analysis of Fine and Coarse Aggregates).

According to one or more embodiments, the at least one mineral filler has a median particle size $d_{50}$ of 0.1-100 μm, preferably 0.5-50 μm, more preferably 0.5-25 μm, even more preferably 1-15 μm, still more preferably 1-10 μm.

According to one or more embodiments, the polymeric hot-melt pressure sensitive adhesive further comprises at least one process oil, preferably in an amount of 0.1-15 wt.-%, preferably 0.5-15, more preferably 1-12.5 wt.-%, even more preferably 2.5-10 wt.-%, based on the total weight of the polymeric hot-melt pressure sensitive adhesive.

According to one or more embodiments, the at least one process oil is selected from the group consisting of mineral oils, synthetic oils, and vegetable oils.

The term "mineral oil" refers to any hydrocarbon liquid of lubricating viscosity (i.e. having a kinematic viscosity at 100° C. of 1 cSt or more) derived from petroleum crude oil and subjected to one or more refining and/or hydroprocessing steps, such as fractionation, hydrocracking, dewaxing, isomerization, and hydrofinishing, to purify and chemically modify the components to achieve a final set of properties. Mineral oils can be characterized as either "paraffinic", "naphthenic", or "aromatic" based on the relative content of paraffinic, naphthenic, and aromatic moieties therein. In particular, the term "mineral" refers in the present disclosure to refined mineral oils, which can be also characterized as Group I-III base oils according the classification of the American Petroleum Institute (API).

Suitable mineral oils to be used as the at least one process oil include paraffinic, naphthenic, and aromatic mineral oils. Particularly suitable mineral oils include paraffinic and napthenic oils containing relatively low amounts of aromatic moieties, such as not more than 25 wt.-%, preferably not more than 15 wt.-%, based on the total weight of the mineral oil.

The term "synthetic oil" refers in the present disclosure to full synthetic (polyalphaolefin) oils, which are also known as Group IV base oils according to the classification of the American Petroleum Institute (API). Suitable synthetic oils are produced from liquid polyalphaolefins (PAOs) obtained by polymerizing α-olefins in the presence of a polymerization catalyst, such as a Friedel-Crafts catalyst. In general, liquid PAOs are high purity hydrocarbons with a paraffinic structure and high degree of side-chain branching. Particularly suitable synthetic oils include those obtained from so-called Gas-To-Liquids (GTL) processes.

According to one of more embodiments, the polymeric hot-melt pressure sensitive adhesive further comprises at least one liquid polyolefin resin, preferably in an amount of 5-50 wt.-%, preferably 10-45 wt.-%, more preferably 15-45 wt.-%, even more preferably 15-40 wt.-%, based on the total weight of the polymeric hot-melt pressure sensitive adhesive. The term "liquid resin" refers in the present disclosure to a resin that flows at normal room temperature, has a pour point of less than 20° C. and/or a kinematic viscosity at 25° C. of 50000 cSt or less.

Particularly suitable liquid polyolefins to be used as the at least one liquid polyolefin resin include liquid polybutene and liquid polyisobutylene (PIB).

The term "liquid polybutene" refers in the present disclosure to low molecular weight olefin oligomers comprising isobutylene and/or 1-butene and/or 2-butene. The ratio of the C4-olefin isomers can vary by manufacturer and by grade. When the C4-olefin is exclusively 1-butene, the material is referred to as "poly-n-butene" or "PNB". The term "liquid polyisobutylene" refers in the present document to low molecular weight olefin oligomers of isobutylene, preferably containing at least 75 wt.-%, more preferably at least 85 wt.-% of repeat units derived from isobutylene. Suitable liquid polybutene and polyisobutylene have an average molecular weight ($M_n$) of less than 10000 g/mol, preferably less than 7500 g/mol, more preferably less than 5000 g/mol, still more preferably less than 3500 g/mol, even more preferably less than 2500 g/mol.

Suitable liquid polybutene and polyisobutylene are commercially available, for example, under the trade name of Indopol®, such as Indopol® H-300 and Indopol® H-1200 (from Ineos); under the trade name of Glissopal®, such as Glissopal® V230, Glissopal® V500, and Glissopal® V700 (from BASF); under the trade name of Dynapak®, such as Dynapak® poly 230 (from Univar GmbH, Germany); and under the trade name of Daelim®, such as Daelim® PB 950 (from Daelim Industrial).

According to one or more embodiments, the at least one liquid polyolefin resin is selected from the group consisting of liquid polybutene and liquid polyisobutylene, preferably having:
- an average molecular weight ($M_n$) of 150-5000 g/mol, preferably 250-3500 g/mol, more preferably 350-2500 g/mol and/or
- a pour point determined according to ISO 3016:2019, in the range of −10 to +15° C., in particular from −10 to +10° C. and/or
- a polydispersity index ($M_w/M_n$), determined by GPC, of not more than 5, preferably in the range of 0.5-5.0, more preferably 1.0-4.5, even more preferably 1.0-3.5.

According to one or more further embodiments, the second adhesive composition is a bituminous hot-melt pressure sensitive adhesive. Bituminous hot-melt pressure sensitive adhesives are well known to a person skilled in the art. These types of adhesives typically comprise bitumen as the main polymer component and various additives, such as, processing oils and fillers. Suitable processing oils to be used in a bituminous hot-melt pressure sensitive adhesive include, for example, mineral oils and synthetic oils.

Bituminous hot-melt pressure sensitive adhesives can be prepared by melting bitumen and mixing the other constituents into the thus obtained molten bitumen mass.

The bitumen contained in a bituminous hot-melt pressure sensitive adhesive is typically modified with one or more polymers in order to improve the mechanical properties of the bitumen component. Typical modifying polymers used in a bituminous hot-melt pressure sensitive adhesive include, for example, atactic polypropylenes (APP), amorphous polyolefins (APO), styrene block copolymers, in particular SIS, SBS, and SEBS block copolymers as well as elastomers, for example, styrene-butadiene rubber (SBR), ethylene propylene diene monomer (EPDM) rubber, polyisoprene, polybutadiene, natural rubber, polychloroprene rubber, ethylene-propylene rubber (EPR), nitrile rubbers, and acrylic rubbers.

The term "amorphous polyolefin" refers to a polyolefin having a degree of crystallinity of less than 10%, preferably less than 5%, more preferably less than 3.5%, measured by differential scanning calorimetry (DSC) conducted according to the method as defined in ISO 11357 standard. Suitable amorphous polyolefins (APO) include, for example, homopolymers of propylene and copolymers of propylene with one or more α-olefin comonomer, such as, for example, ethylene, 1-butene, 1-hexene, 1-octene and 1-decene.

According to one or more embodiments, the bituminous hot-melt pressure sensitive adhesive comprises:
- A') 15-95 wt.-%, preferably 25-90 wt.-%, more preferably 35-85 wt.-% of bitumen,
- B') 5-35 wt.-%, preferably 10-30 wt.-%, more preferably 10-25 wt.-% of at least one modifying polymer, and
- C') 0-40 wt.-%, preferably 0-35 wt.-% of at least one processing oil, preferably at least one mineral oil, all proportions being based on the total weight of the bituminous hot-melt pressure sensitive adhesive.

According to one or more embodiment, the at least one modifying polymer is selected from the group consisting of atactic polypropylenes (APP), amorphous polyolefins (APO), styrene block copolymers, styrene-butadiene rubber (SBR), ethylene propylene diene monomer (EPDM) rubber, polyisoprene, polybutadiene, natural rubber, polychloroprene rubber, ethylene-propylene rubber (EPR), nitrile rubbers, and acrylic rubbers.

The bituminous hot-melt pressure sensitive adhesive may further comprise not more than 60 wt.-%, preferably not more than 55 wt.-%, more preferably not more than 45 wt.-%, based on the total weight of the bituminous hot-melt pressure sensitive adhesive, of at least one mineral filler, preferably selected from the group consisting of silica, calcium carbonate, talc, or clay.

According to one or more embodiments, the separation sheet comprises iv) a first release liner covering the outwardly facing surface of the first adhesive layer opposite to the side of the carrier layer and v) a second release liner covering the outwardly facing surface of the second adhesive layer opposite to the side of the carrier layer.

Preferably, the first adhesive layer and the first release liner are directly connected to each other over at least portion of their opposing major surfaces and the second adhesive layer and the second release liner are directly connected to each other over at least portion of their opposing major surfaces The release liners may be used to prevent premature unwanted adhesion and to protect the adhesive layers from moisture, fouling, and other environmental factors. In case the sealing device is provided in form of rolls, the release liner enables ease of unwind without sticking of the adhesive to the back side of the sealing device. The release liners may be sliced into multiple sections to allow portioned detachment of the liner from the respective adhesive layer.

Suitable materials for the first and second release liner include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents.

According to one or more embodiments, the separation sheet is composed of the layers i) to v).

The preferences given above for the polymeric carrier layer, the first and second adhesive layers, and to the first and second release liner apply equally to all aspects of the present invention unless otherwise stated.

Another subject of the present invention is a method for producing a separation sheet according to the present invention, the method comprising steps of:
- I.) Providing the first adhesive layer on the first major surface of the carrier layer,
- II.) Providing the second adhesive layer on the second major surface of the carrier layer,
- III.) Optionally covering the outwardly facing surface of the first adhesive layer opposite to the side of the carrier layer with a first release liner, and
- IV.) Optionally covering the outwardly facing surface of the second adhesive layer opposite to the side of the carrier layer with a second release liner.

The further details of the method for producing the separation sheet depend on the embodiment of the separation sheet, particularly the type of the first and second adhesive compositions.

For example, in case the first adhesive composition is a hot-melt pressure sensitive adhesive, step I.) of the method preferably comprises heating the first adhesive composition to an elevated temperature and applying the adhesive layer as a melt onto the first major surface of the polymeric carrier layer. Furthermore, in case the first adhesive composition is an UV-cured acrylic pressure sensitive adhesive, step I.) of the method preferably comprises applying an UV-curable acrylic pressure sensitive adhesive as a film onto the first major surface of the polymeric carrier layer, wherein the method comprises a further step of subjecting the adhesive film to UV-radiation thereby to effect curing of the adhesive composition. Step of subjecting the film of the UV-curable acrylic pressure sensitive adhesive to UV-radiation can be conducted before or after step III.), i.e. the film of the UV-curable acrylic pressure sensitive adhesive may also be cured after the adhesive film has been covered with the first release liner. The above presented considerations apply also for the second adhesive layer.

The first and second adhesive compositions may be applied to the respective major surfaces the polymeric carrier layer by using any conventional techniques such as slot die coating, extrusion coating, roller coating, direct gravure coating, offset gravure coating, reverse gravure roll coating, powder dispersion, or spray lamination techniques.

According to one or more embodiments, the method comprises a further step V.) of winding the composite element obtained in step IV.) into a roll.

Another subject of the present invention is a method for waterproofing a substrate, the method comprising steps of:
  I) Providing a separation sheet according to the present invention,
  II) Applying the separation sheet onto a surface of a substrate such that at least a portion of the outer major surface of the second adhesive layer is directly connected to the surface of the substrate,
  III) Pressing the separation sheet against the surface of the substrate with a pressure sufficient to affect adhesive bonding between the polymeric carrier layer and the substrate,
  IV) Providing a membrane having a first and a second major surface and covering the separation sheet with the membrane such that at least a portion of the outer major surface of the first adhesive layer is directly connected to the second major surface of the membrane, and
  V) Pressing the membrane against the surface of the substrate with a pressure sufficient to affect adhesive bonding between the membrane and the polymeric carrier layer.

FIG. 2 shows a schematic presentation of the method for waterproofing a substrate according to the present invention.

The separation sheet can be provided in form of a roll in step I) and then applied onto a surface of a substrate such that at least a portion of the outer major surface of the second adhesive layer is directly connected to the surface of the substrate, as shown in FIG. 2.1. In order to bond the polymeric carrier layer onto the surface of the substrate, the separation sheet is pressed against the surface of the substrate. FIG. 2.2 shows the separation sheet that is adhesively bonded to the surface of the substrate via the second adhesive layer. The membrane can be provided in form of a roll in step IV) and then applied to cover the separation sheet such that the outer major surface of the first adhesive layer is directly connected to the second major surface of the membrane, as shown in FIG. 2.3. In order to bond the membrane to the polymeric carrier layer, the membrane is pressed against the surface of the substrate. FIG. 2.4 shows the membrane that is adhesively bonded to the polymeric carrier layer via the first adhesive layer.

According to one or more embodiments, the separation sheet comprises a first release liner covering the outwardly facing surface of the first adhesive layer and a second release liner covering the outwardly facing surface of the second adhesive layer, wherein the method for waterproofing a substrate comprises steps of:
  I) Providing a separation sheet according to the present invention,
  I') Removing at least a portion of the second release liner,
  II) Applying the separation sheet onto a surface of a substrate such that at least a portion of the outer major surface of the second adhesive layer is directly connected to the surface of the substrate,
  III) Pressing the separation sheet against the surface of the substrate with a pressure sufficient to affect adhesive bonding between the polymeric carrier layer and the substrate,
  III') Removing at least a portion of the first release liner,
  IV) Providing a membrane having a first and a second major surface and covering the separation sheet with the membrane such that at least a portion of the outer major surface of the first adhesive layer is directly connected to the second major surface of the membrane, and
  V) Pressing the membrane against the surface of the substrate with a pressure sufficient to affect adhesive bonding between the membrane and the polymeric carrier layer.

According to one or more embodiments, the first release liner is removed from only a portion of the outer major surface of the first adhesive layer in step III') and the method comprises a further step of removing the release liner from the entire outer major surface of the first adhesive layer before the membrane is pressed against the surface of the substrate in step V) of the method.

Suitable membranes to be used in the method for waterproofing a substrate include single- and multi-ply membranes. The term "single-ply membrane" designates in the present disclosure membranes comprising exactly one waterproofing layer whereas the term "multi-ply membrane" designates membranes comprising two or more waterproofing layers. The waterproofing layers of a multi-ply membrane may have similar or different compositions. Commonly used materials for roofing and waterproofing membranes include plastics, in particular thermoplastics such as plasticized polyvinylchloride (p-PVC), thermoplastic olefins (TPE-O, TPO), copolymers of ethylene and vinyl acetate, and elastomers such as ethylene-propylene diene monomer (EPDM), and bitumen.

Single- and multi-ply roofing and waterproofing membranes are known to a person skilled in the art and they may be produced by any conventional means, such as by way of extrusion or co-extrusion, calendaring, or hot-pressing.

According to one or more embodiments, the membrane comprises a PVC-based waterproofing layer or a bitumen-based waterproofing layer, preferably a PVC-based waterproofing layer. The term "PVC-based waterproofing layer" refers in the present disclosure to waterproofing layers comprising at least 25 wt.-%, preferably at least 35 wt.-%, based on the total weight of the waterproofing layer, of a polyvinylchloride resin.

According to one or more embodiments, the substrate is a roof substrate, preferably selected from the group consisting of a concrete base, an existing membrane, and a thermal insulation board.

Suitable thermal insulation boards to be used in waterproofed structures include, for example, foamed insulation boards, such as expanded polystyrene (EPS), extruded expanded polystyrene (XPS), and polyisocyanurate (PIR) boards.

Another subject of the present invention is a waterproofed structure comprising a substrate, a separation sheet according to the present invention, and a membrane having a first and a second major surfaces, wherein at least a portion of the second major surface of the membrane is bonded to the first major surface of the carrier layer via the first adhesive layer and wherein at least a portion of the second major surface of the carrier layer is bonded to the surface of the substrate via the second adhesive layer.

Suitable membranes to be used in the waterproofed structure include single- and multi-ply roofing and waterproofing membranes.

According to one or more embodiments, the substrate is a roof substrate, preferably selected from the group consisting of a concrete base, an existing membrane, or a thermal insulation board.

Suitable thermal insulation boards to be used in the waterproofed structure include, for example, foamed insulation boards, such as expanded polystyrene (EPS), extruded expanded polystyrene (XPS), and polyisocyanurate (PIR) boards.

Still another subject of the present invention is use of the separation sheet according to the present invention for bonding of roofing membranes to roof substrates.

EXAMPLES

Preparation of Test Specimens

Two exemplary separation sheets having following build-ups were tested for their adhesive bonding properties:
  i) A polymeric carrier layer composed of closed cell ethylene vinyl acetate foam, thickness 1200 µm,
  ii) A first adhesive layer, composed of AC PSA
  iii) A second adhesive layer, composed of HM-PSA 1 or HM-PSA 2,
  iv) A first release liner, and
  v) A second release liner.

The first adhesive layer was composed of a solvent-based acrylic pressure sensitive adhesive (AC PSA) and the adhesive layer had a thickness of 60 µm.

In case of the first separation sheet, the second adhesive layer was composed of a hot-melt pressure sensitive adhesive based on styrene-isoprene-styrene (SIS) and styrene-butadiene-styrene (SBS) block copolymers (HM-PSA 1) and the adhesive layer had a thickness of 250 µm.

In case of the second separation sheet, the second adhesive layer was composed of a hot-melt pressure sensitive adhesive based on butyl rubber (HM-PSA 2) and the adhesive layer had a thickness of 400 µm.

The tested separation sheets were prepared by applying the first and second adhesive layers to the opposite surfaces of the polymeric carrier layer followed by covering the adhesive layers with conventional release liners. The thus obtained test specimens were then tested for their adhesive bonding properties.

The values for peel resistance from aluminum plate at 180° and 90° peel angles and for holding power from stainless steel plate obtained with the first separation sheet are presented in Table 1. The corresponding values obtained with the second separation sheet are presented in Table 2.

Peel Strength

Peel resistances from an aluminum plate were measured at an angle of 180° and 90° at a temperature of 23±2° C. using a cross head speed of 100 mm/min. Samples were cut from the exemplary separation sheet prepared as described above and bonded via one of the first and second adhesive layers to the aluminum plate to form test composite specimens.

The peel strengths were measured in three different cases. In the first case, a sample having dimensions of 50×250 mm was adhered to an aluminum plate followed by measurement of the peel strengths. In the second case, a sample having dimensions of 50×250 mm was adhered to an aluminum plate and the thus obtained test composite specimen was stored immersed in water at a temperature of 23° C. for a time period of 168 hours before measuring of the peel strengths. In the third case, a first sample having dimensions of 150×250 mm was cut from the exemplary separation sheet and stored at a temperature of 70° C. for a time period of 168 hours before measuring of the peel strengths. A second sample having dimensions of 50×250 mm was then cut from the thermally treated first sample and adhered on an aluminum plate to form a composite specimen followed by measurement of the peel strengths.

The peel strengths at an angle of 180° and 90° were measured according to GB/T 23260-2009 standard and EN 12316-2:2013 standard, respectively.

Holding Power

Figure 4:
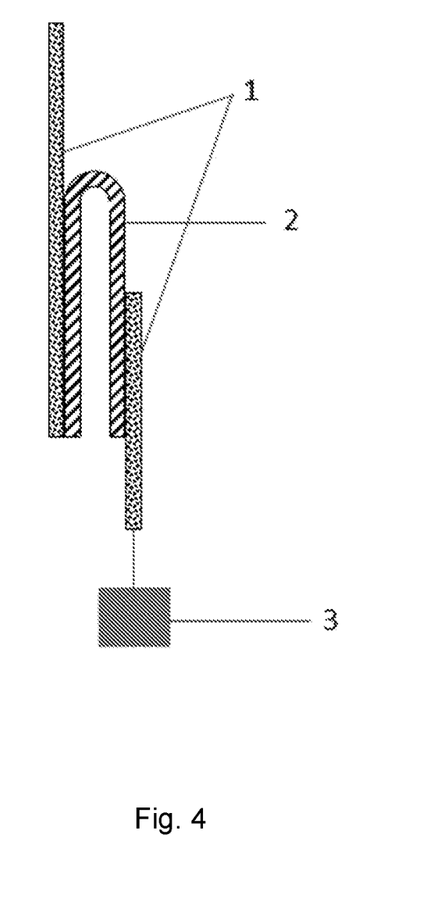
FIG. 4 shows a schematic presentation of the arrangement for measurement of a holding power of a double-sided adhesive sheet.
Figure 21:
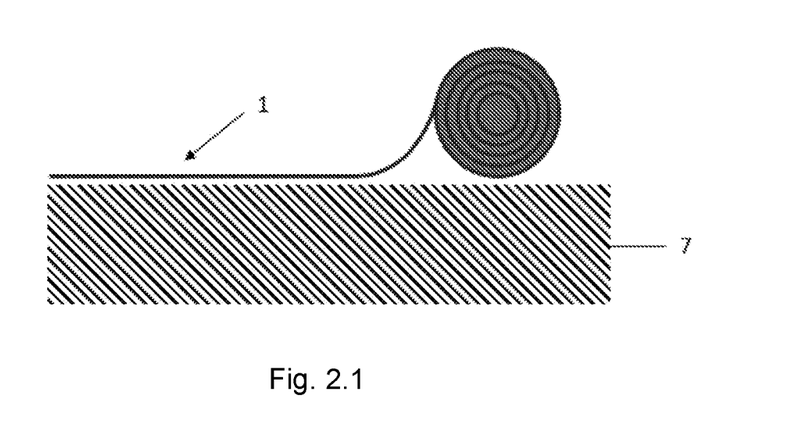
Figure 22:
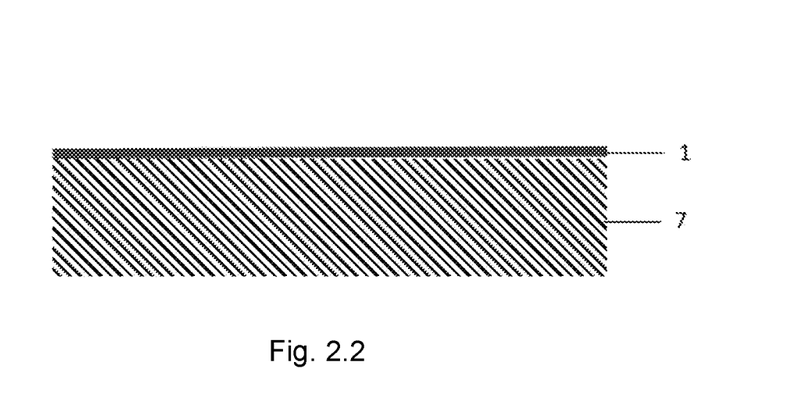
Figure 23:
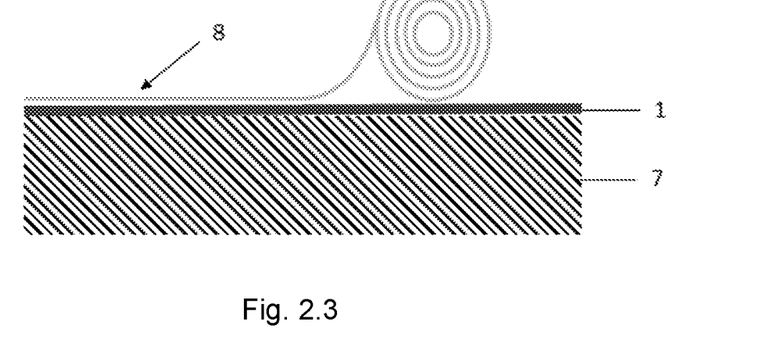
Figure 24:
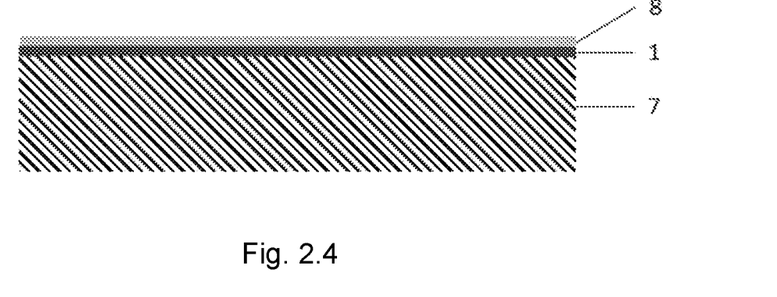

A sample having dimensions of 150×50 mm was cut from the exemplary separation sheet, folded over itself, and adhered to a first stainless-steel plate and to a second stainless-steel plate via one of the adhesive layers as shown in FIG. 4 below. The bonding area between the portion of the adhesive layer and the steel plates had dimensions of 50×50 mm. A weight of 1 kg was attached to the lower end of the second stainless-steel plate and the length of the time period between bonding of the sample and adhesive bond failure (detachment of the sample from the steel plate) was recorded.

In FIG. 4, number 1 refers to the first and second stainless-steel plates, number 2 refers to the sample, and number 3 refers to the 1 kg weight attached to the lower end of the second steel plate.

TABLE 1

| Tested property | Fracture interface | Result | Unit |
| --- | --- | --- | --- |
| Peel resistance from Al plate 180° | Between AC PSA layer and Al plate | 61 | N/50 mm |
| | Between HM-PSA 1 layer and Al plate | 74 | |
| Peel resistance from Al plate 180°, after water storage at 23° C. for 168 hours | Between AC PSA layer and Al plate | 55 | N/50 mm |
| | Between HM-PSA 1 layer and Al plate | 61 | |
| Peel resistance from Al plate 180°, after heat treatment at 70° C. for 168 hours | Between AC PSA layer and Al plate | 58 | N/50 mm |
| | Between HM-PSA 1 layer and Al plate | 85 | |

TABLE 1-continued

| Tested property | Fracture interface | Result | Unit |
|---|---|---|---|
| Peel resistance from Al plate 90° | Between AC PSA layer and Al plate | 23 | N/50 mm |
|  | Between HM-PSA 1 layer and Al plate | 59 |  |
| Holding power | AC PSA | 55 | min$^a$ |
|  | HM PSA 1 | 198 |  |

TABLE 2

| Tested property | Fracture interface | Result | Unit |
|---|---|---|---|
| Peel resistance from Al plate 180° | Between AC PSA layer and Al plate | 63 | N/50 mm |
|  | Between HM-PSA 2 layer and Al plate | 58 |  |
| Peel resistance from Al plate 180°, after water storage at 23° C. for 168 hours | Between AC PSA layer and Al plate | 55 | N/50 mm |
|  | Between HM-PSA 2 layer and Al plate | 56 |  |
| Peel resistance from Al plate 180°, after heat treatment at 70° C. for 168 hours | Between AC PSA layer and Al plate | 61 | N/50 mm |
|  | Between HM-PSA 2 layer and Al plate | 66 |  |
| Peel resistance from Al plate 90° | Between AC PSA layer and Al plate | 23 | N/50 mm |
|  | Between HM-PSA 2 layer and Al plate | 58 |  |
| Holding power | AC PSA | 55 | min$^a$ |
|  | HM PSA 2 | 25 |  |

The invention claimed is:

1. A separation sheet comprising:
   (i) a polymeric carrier layer having a first and a second major surface,
   (ii) a first adhesive layer covering at least a portion of the first major surface of the polymeric carrier layer,
   (iii) a second adhesive layer covering at least a portion of the second major surface of the polymeric carrier layer,
   (iv) a first release liner covering the outwardly facing surface of the first adhesive layer opposite to the side of the polymeric carrier layer, and
   (v) a second release liner covering the outwardly facing surface of the second adhesive layer opposite to the side of the polymeric carrier layer, wherein
   the first adhesive layer is composed of a first adhesive composition and the second adhesive layer is composed of a second adhesive composition different from the first adhesive composition;
   the first adhesive layer is continuous and the second adhesive layer is continuous;
   the first adhesive layer covers at least 50% of the area of the first major surface of the polymeric carrier layer; and
   the second adhesive layer comprises a hot-melt adhesive that covers at least 50% of the area of the second major surface of the polymeric carrier layer, wherein
   the hot-melt adhesive comprises a bituminous hot-melt pressure sensitive adhesive comprising:
   (a) 15-95 wt.-% of bitumen,
   (b) 5-35 wt.-% of at least one modifying polymer, and
   (c) 0-40 wt.-% of at least one processing oil,
   all proportions being based on the total weight of the bituminous hot-melt pressure sensitive adhesive.

2. The separation sheet according to claim 1, wherein the polymeric carrier layer has a thickness of at least 0.15 mm and/or a width within the range of 0.35 m to 5 m.

3. The separation sheet according to claim 1, wherein the polymeric carrier layer is composed of cellular foam material.

4. The separation sheet according to claim 3, wherein the cellular foam material comprises a closed cell foam selected from the group consisting of ethylene vinyl acetate foam, polyurethane foam, ethylene propylene diene monomer foam, polyolefin foam, polyvinylchloride foam, and plasticized polyvinylchloride foam.

5. The separation sheet according to claim 1, wherein the first adhesive layer has a thickness of at least 25 μm and/or the second adhesive layer has a thickness of at least 45 μm.

6. The separation sheet according to claim 1, wherein the first adhesive composition is a plasticizer resistant pressure sensitive adhesive.

7. The separation sheet according to claim 1, wherein the polymeric carrier layer has a width within the range of 0.25 to 5 m.

8. The separation sheet according to claim 1, wherein the polymeric carrier layer has a thickness within the range of 0.35 to 5 mm and a width within the range of 0.65 m to 4 m.

9. The separation sheet according to claim 1, wherein the polymeric carrier layer has a thickness within the range of 0.8 to 2 mm and a width within the range of 0.75 m to 3 m.

10. The separation sheet according to claim 1, wherein the hot-melt adhesive comprises a bituminous hot-melt pressure sensitive adhesive comprising:
    (a) 25-90 wt.-% of bitumen,
    (b) 10-30 wt.-% of at least one modifying polymer, and
    (c) 0-35 wt.-% of at least one mineral oil.

11. A method for producing a separation sheet as defined in claim 1, the method comprising steps of:
    (i) providing the first adhesive layer on the first major surface of the polymeric carrier layer to cover all or substantially all of the area of the first major surface of the polymeric carrier layer,
    (ii) providing the second adhesive layer comprising a hot melt adhesive on the second major surface of the polymeric carrier layer to cover all or substantially all of the area of the second major surface of the polymeric carrier layer; and
    (iii) covering the outwardly facing surface of the first adhesive layer opposite to the side of the polymeric carrier layer with a first release liner and
    (iv) covering the outwardly facing surface of the second adhesive layer opposite to the side of the polymeric carrier layer with a second release liner.

12. A method for waterproofing a substrate comprising steps of:
(i) providing a separation sheet according to claim 1,
(ii) applying the separation sheet onto a surface of the substrate such that all or substantially all of the outer major surface of the second adhesive layer is directly connected to the surface of the substrate,
(iii) pressing the separation sheet against the surface of the substrate with a pressure sufficient to affect adhesive bonding between the polymeric carrier layer and the substrate,
(iv) providing a membrane having a first and a second major surface and covering the separation sheet with the membrane such that at least all or substantially all of the outer major surface of the first adhesive layer is directly connected to the second major surface of the membrane, and
(v) pressing the membrane against the surface of the substrate with a pressure sufficient to affect adhesive bonding between the membrane and the polymeric carrier layer.

13. The method according to claim 12, wherein the substrate is a roof substrate.

14. A waterproofed structure comprising a substrate, a separation sheet according to claim 1, and a membrane having a first and a second major surface, wherein all or substantially all of the second major surface of the membrane is bonded to the first major surface of the polymeric carrier layer via the first adhesive layer and in that all or substantially all of the second major surface of the polymeric carrier layer is bonded to the surface of the substrate via the second adhesive layer.

15. The waterproofed structure according to claim 14, wherein the substrate is a roof substrate.

16. A method for bonding a roofing membrane to a roof substrate, comprising applying the separation sheet according to claim 1 between the roofing membrane and the roof substrate.

17. A separation sheet comprising:
(i) a polymeric carrier layer having a first and a second major surface,
(ii) a first adhesive layer covering at least a portion of the first major surface of the polymeric carrier layer,
(iii) a second adhesive layer covering at least a portion of the second major surface of the polymeric carrier layer,
(iv) a first release liner covering the outwardly facing surface of the first adhesive layer opposite to the side of the polymeric carrier layer, and
(v) a second release liner covering the outwardly facing surface of the second adhesive layer opposite to the side of the polymeric carrier layer, wherein
the first adhesive layer is composed of a first adhesive composition and the second adhesive layer is composed of a second adhesive composition different from the first adhesive composition;
the first adhesive layer is continuous and the second adhesive layer is continuous;
the first adhesive layer covers at least 50% of the area of the first major surface of the polymeric carrier layer; and
the second adhesive layer covers at least 50% of the area of the second major surface of the polymeric carrier layer, wherein
at least one of the first adhesive layer and the second layer comprises an acrylic pressure sensitive adhesive comprising:
(a) at least 65 wt.-% of at least one acrylic polymer,
(b) 0.01-5 wt.-% of at least one curing agent,
(c) 0.1-5 wt.-% of at least one photo initiator, and
(d) 0-30 wt.-% of at least one tackifying resin,
all proportions being based on the total weight of the acrylic pressure sensitive adhesive composition.

18. The separation sheet according to claim 17 wherein the acrylic pressure sensitive adhesive comprises:
(a) at least 85 wt.-% of the at least one acrylic polymer,
(b) 0.1-1 wt.-% of at least one curing agent,
(c) 0.25-2.5 wt.-% of at least one photo initiator, and
(d) 5.0-20 wt.-% of at least one tackifying resin,
all proportions being based on the total weight of the acrylic pressure sensitive adhesive composition.

19. A separation sheet comprising:
(i) a polymeric carrier layer having a first and a second major surface,
(ii) a first adhesive layer covering at least a portion of the first major surface of the polymeric carrier layer,
(iii) a second adhesive layer covering at least a portion of the second major surface of the polymeric carrier layer,
(iv) a first release liner covering the outwardly facing surface of the first adhesive layer opposite to the side of the polymeric carrier layer, and
(v) a second release liner covering the outwardly facing surface of the second adhesive layer opposite to the side of the polymeric carrier layer, wherein
the first adhesive layer is composed of a first adhesive composition and the second adhesive layer is composed of a second adhesive composition different from the first adhesive composition;
the first adhesive layer is continuous and the second adhesive layer is continuous;
the first adhesive layer covers at least 50% of the area of the first major surface of the polymeric carrier layer; and
the second adhesive layer comprises a hot-melt adhesive that covers at least 50% of the area of the second major surface of the polymeric carrier layer, wherein
the hot-melt adhesive comprises a polymeric hot-melt pressure sensitive adhesive comprising:
(a) 5-65 wt.-% of styrene block copolymer,
(b) 10-80 wt.-% of at least one tackifying resin, and
(c) 5-60 wt.-% of at least one mineral filler,
(d) up to 25 wt.-% of at least one process oil, and
(e) 5-50 wt.-% of at least one liquid polyolefin resin,
all proportions being based on the total weight of the polymeric pressure sensitive adhesive.

* * * * *